US009616342B2

(12) United States Patent  
Motokura et al.

(10) Patent No.: US 9,616,342 B2  
(45) Date of Patent: Apr. 11, 2017

(54) VIDEO GAME SYSTEM, APPARATUS AND METHOD

(71) Applicant: Nintendo Co., Ltd., Kyoto (JP)

(72) Inventors: Kenta Motokura, Kyoto (JP); Tatsuro Ota, Kyoto (JP); Yusuke Kitazono, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 268 days.

(21) Appl. No.: 14/286,469

(22) Filed: May 23, 2014

(65) Prior Publication Data

US 2015/0336006 A1 Nov. 26, 2015

(51) Int. Cl.
*A63F 9/00* (2006.01)
*A63F 13/77* (2014.01)
*A63F 13/79* (2014.01)
*A63F 13/497* (2014.01)
*A63F 13/35* (2014.01)

(52) U.S. Cl.
CPC ............ *A63F 13/77* (2014.09); *A63F 13/497* (2014.09); *A63F 13/79* (2014.09); *A63F 13/35* (2014.09)

(58) Field of Classification Search
None
See application file for complete search history.

(56) References Cited

U.S. PATENT DOCUMENTS

| | | | |
|---|---|---|---|
| 6,488,505 B1* | 12/2002 | Hightower | A63F 13/10 434/118 |
| 8,103,700 B2 | 1/2012 | Yabuki et al. | |
| 8,164,595 B2 | 4/2012 | Yabuki et al. | |
| 8,500,558 B2* | 8/2013 | Smith | A63F 13/12 345/419 |
| 8,527,553 B2 | 9/2013 | Yabuki et al. | |
| 8,696,464 B2 | 4/2014 | Smith | |
| 9,067,133 B2* | 6/2015 | Smith | A63F 13/12 |
| 2005/0277455 A1* | 12/2005 | Chudley | A63F 13/10 463/6 |
| 2006/0003825 A1* | 1/2006 | Iwasaki | A63F 13/10 463/2 |
| 2006/0246971 A1* | 11/2006 | Ellis | A63B 71/06 463/4 |
| 2007/0060359 A1* | 3/2007 | Smith | A63F 13/12 463/42 |

(Continued)

FOREIGN PATENT DOCUMENTS

JP  2003-320164  11/2003

*Primary Examiner* — Seng H Lim
(74) *Attorney, Agent, or Firm* — Nixon & Vanderhye, P.C.

(57) ABSTRACT

An example video game system includes user controls and memory for storing a video game program. A processing system including at least one processor executes the video game program to provide a three-dimensional (3D) virtual game world including a player character. The processing system periodically stores in the memory ghost data for the player character as the player character moves in the 3D virtual game world, based on inputs to the user controls, during a first game play session. The processing system generates a ghost character during a second game play session whose movement in the 3D virtual game world is based on the ghost data stored in the memory. The ghost character appears in the second game play session at a time subsequent to the beginning of the second game play session.

23 Claims, 6 Drawing Sheets

(56) References Cited

U.S. PATENT DOCUMENTS

2009/0189351 A1\* 7/2009 Baerlocher ............. G07F 17/32
  273/309
2010/0009759 A1\* 1/2010 Kobayashi ............. A63F 13/12
  463/42
2013/0303248 A1\* 11/2013 Williams ................ A63F 9/143
  463/6

\* cited by examiner

NON-LIMITING
EXAMPLE GAME SYSTEM

NON-LIMITING
EXAMPLE CONTROLLER

VIDEO GAME SYSTEM, APPARATUS AND METHOD

BACKGROUND AND SUMMARY

This application describes a ghost feature for a video game system.

As described in greater detail below, a non-limiting example video game system includes user controls (e.g., an input device, a controller, and/or the like) and memory for storing a video game program. A processing system includes at least one processor for executing the video game program to provide a three-dimensional (3D) virtual game world including a player character. The processing system periodically stores in the memory ghost data for the player character as the player character moves in the 3D virtual game world, based on inputs to the user controls, during a first game play session. The processing system generates a ghost character during a second game play session whose movement and, in some cases, actions, in the 3D virtual game world is based on the ghost data stored in the memory.

In accordance with one, non-limiting aspect of the ghost feature described herein, the ghost character appears in the second game play session at a time subsequent to the beginning of the second game play session.

In accordance with another, non-limiting aspect of the ghost feature described herein, the number of ghost characters depends on the number of player characters in the second game play session.

In accordance with yet another, non-limiting aspect of the ghost feature described herein, the appearance of the ghost character differs from that of the corresponding player character. For example, the appearance of the ghost character may correspond to an avatar of a game player who controlled the corresponding player character.

In accordance with yet another non-limiting aspect of the ghost feature described herein, the player character and the corresponding ghost character are free-roaming. By way of example and without limitation, movements of the player character and the corresponding ghost character are not confined to being along a predetermined track or path.

DETAILED DESCRIPTION OF EXAMPLE EMBODIMENTS

This application describes example systems and methods that relate to a ghost feature of a video game. The video game may be played using a video game console, a hand-held gaming device, a personal digital assistant, a cellular phone, a pad-type or tablet-type computer, a notebook computer, a personal computer (e.g., a desktop computer) and the like. In one example implementation, each of one or more players controls a player character in response to inputs supplied to a respective input device. The input device may include one or more of buttons, keys, sliders, joysticks, cross-switches, triggers, analog pads, touch pads, touch screens, and the like and may also permit determination of aspects of motion, position and/or orientation through the use of one or more of cameras, accelerometers, gyro sensors, ultrasonic transducers, magnetometers and the like.

Figure 1:
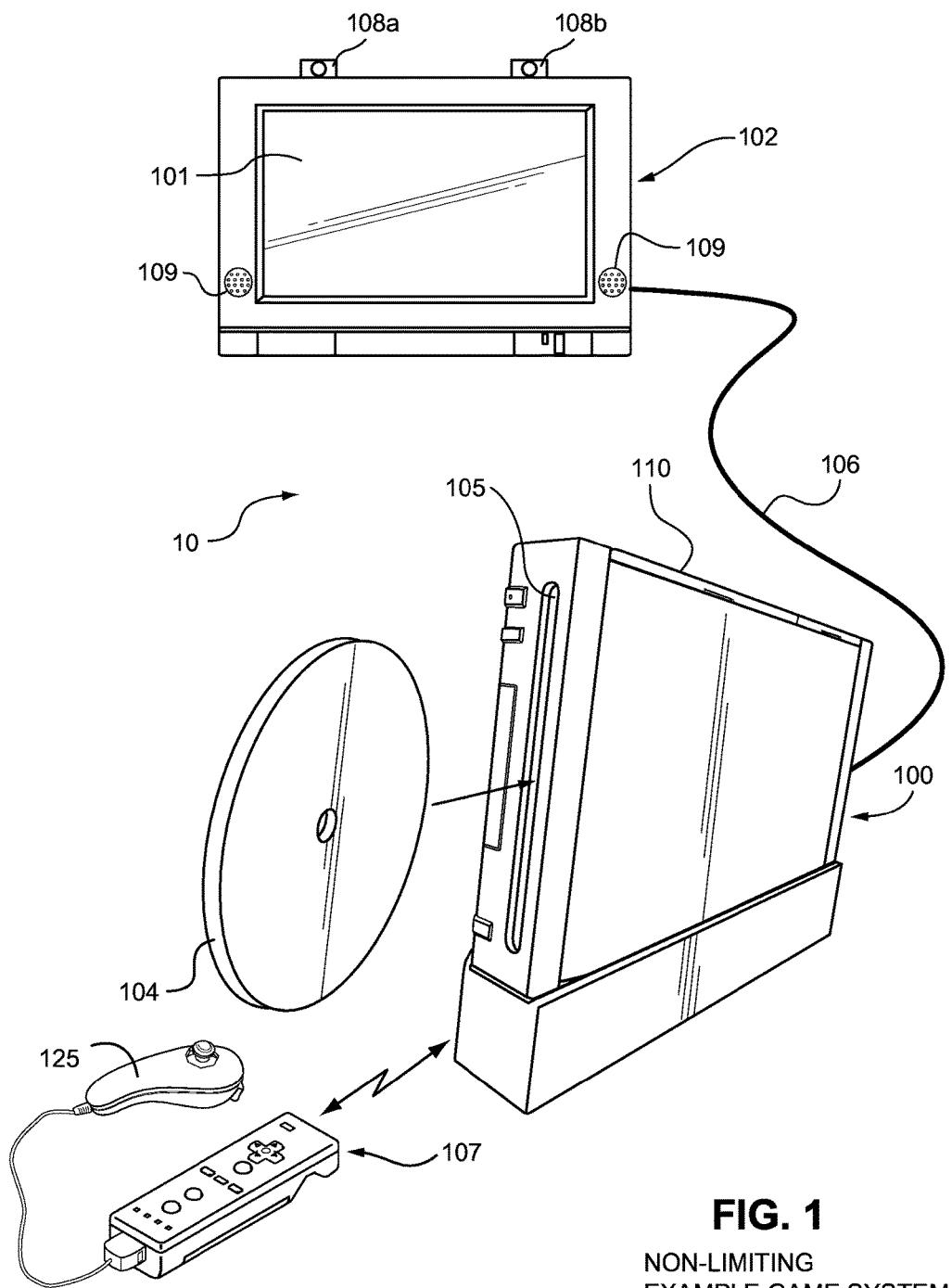
FIG. 1 shows an example game system in which the systems and methods described herein can be used.

FIG. 1 shows a non-limiting, example game system 10 in which the ghost feature described herein may be implemented. As shown in FIG. 1, example game system 10 includes a game console 100, a television 102 and a controller 107. While FIG. 1 shows a video game console, the ghost feature described herein is in no way limited to this gaming environment and can also be implemented in video games running on hand-held gaming devices, personal digital assistants, cellular telephones, pad-type or tablet-type computers, notebook computers, personal computers and the like.

Game console 100 executes a game program(s) or other software application(s) stored on optical disc 104, which is inserted into slot 105 formed in housing 110 thereof. The result of the execution of the game program or other application is displayed on display screen 101 of television 102 to which game console 100 is connected by cable 106. Audio associated with the game program or other application is output via speakers 109 of television 102. While an optical disk is shown in FIG. 1, the game program or other application may alternatively or additionally be stored in whole or part on other removable or non-removable, non-transitory storage media such as semiconductor memories, magneto-optical memories, magnetic memories and the like. The game program may also be stored on a server accessible to the game console 100 via a communication network (e.g., the internet).

Controller 107 is held in a player's hand and wirelessly transmits data such as game control data to the game console 100. The game control data may be generated using an operation section of controller 107 having, for example, a plurality of operation buttons, a key, a stick and the like. Controller 107 may also wirelessly receive data transmitted from game console 100. Any one of various wireless protocols such as Bluetooth (registered trademark) or WiFi may be used for the wireless transmissions between controller 107 and game console 100.

A "nunchuk" controller 125 may be selectively connected to controller 107. Although a wired connection is shown in FIG. 1 between controller 107 and nunchuk controller 125, alternatively, a wireless connection may be used. Nunchuk controller 125 may be held in the user's "other" hand (i.e., the hand not holding controller 107) and provides additional game control data to video game console 100.

Controller 107 also includes a camera (not shown) on a front end thereof for capturing images from light-emitting devices 108a and 108b. Although markers 108a and 108b are shown in FIG. 1 as being above television 102, they may also be positioned below television 102. In addition, although the markers are shown as being separate from television 102, the markers may also be built-into television 102. In one implementation, a center point between light-emitting devices 108a and 108b is substantially aligned with a vertical center-line of display screen 101. The images from light-emitting devices 108a and 108b can be used to determine, for example, aspects of a direction in which controller 107 is pointing. Additional details of the imaging operation may be found in U.S. Patent Publication No. 2007-0066394 A1; U.S. Patent Publication No. 2007-0072674 A1; and U.S.

Patent Publication No. 2007-0060228 A1. The entire contents of each of these applications are expressly incorporated by reference herein.

Controller 107 also preferably includes an accelerometer(s) and/or a gyro sensor(s). For example, controller 107 may include a three-axis, linear accelerometer that detects linear acceleration in three directions, e.g., the up/down direction, the left/right direction, and the forward/backward direction. Linear accelerometers are only capable of detecting acceleration along a straight line corresponding to each axis thereof. In other words, the direct output of the accelerometer is limited to signals indicative of linear acceleration (static or dynamic) along each of the axes thereof. As a result, the accelerometer cannot directly detect movement along a non-linear (e.g. arcuate) path, rotation, rotational movement, angular displacement, tilt, position, attitude or any other physical characteristic. However, through additional processing of the linear acceleration signals output from the accelerometer, additional information relating to controller 107 can be inferred or calculated (determined). For example, by detecting static, linear acceleration (i.e., gravity), the linear acceleration output of the accelerometer can be used to determine aspects of tilt of the controller relative to the gravity vector by correlating tilt angles with detected linear acceleration. In this way, the accelerometer can be used in combination with a processor (such as a processor of the video game console 100) to determine aspects of, for example, roll, pitch, tilt, attitude or position of controller 107. Similarly, aspects of various movements and/or positions of controller 107 can be calculated through processing of the linear acceleration signals generated by the accelerometer when controller 107 is subjected to dynamic accelerations by, for example, a user shaking or waving the controller.

Gyro sensors can be used in addition to, or in place of, the acceleration sensor for determining, for example, aspects of movement, tilt, etc. of the controller.

Figure 2:
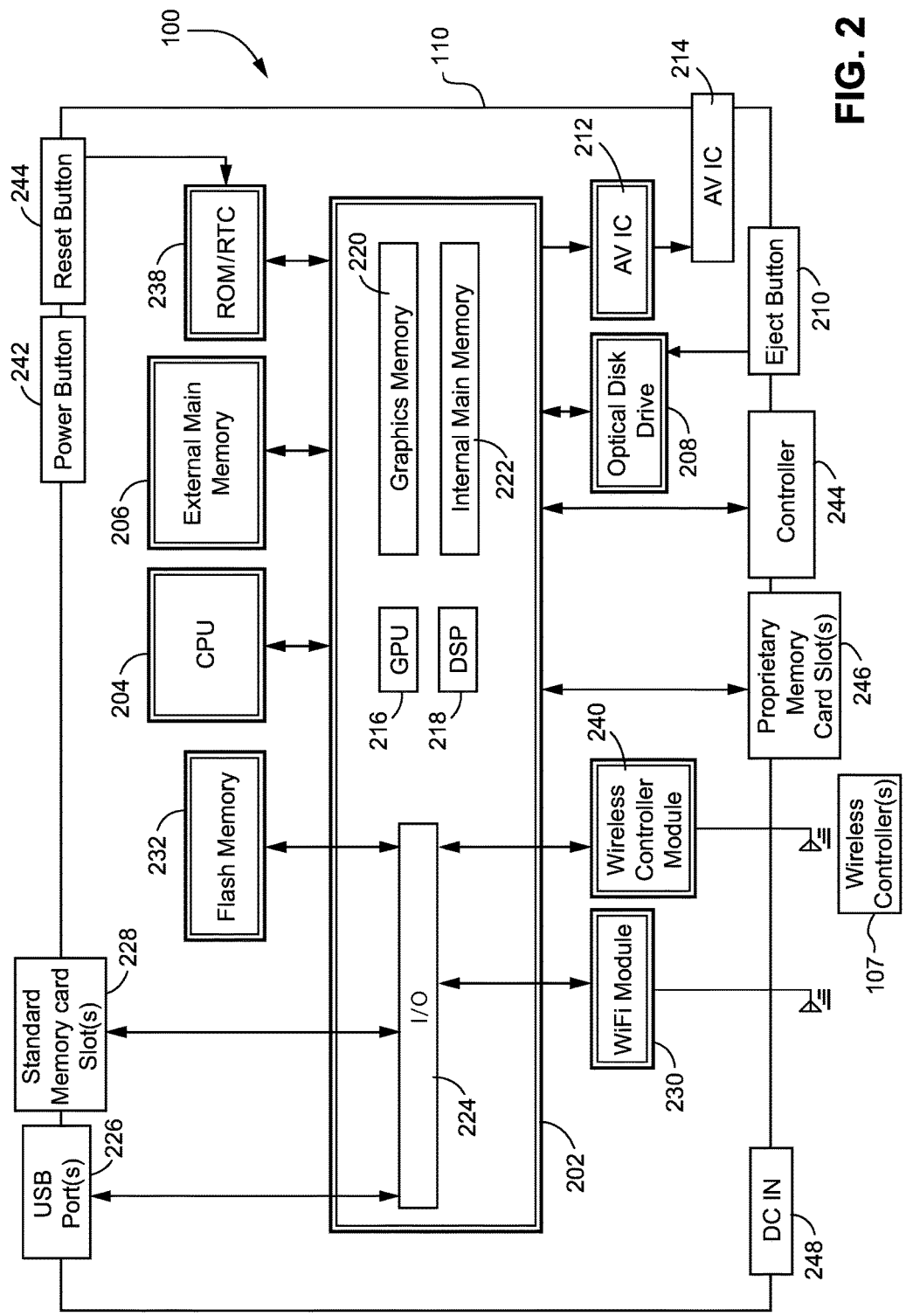
FIG. 2 is a detailed block diagram showing components of example game console 100 of FIG. 1.

With reference to the block diagram of FIG. 2, game console 100 includes a RISC central processing unit (CPU) 204 for executing various types of software applications including (but not limited to) video game programs. CPU 204 executes a boot program stored, for example, in a boot ROM to initialize game console 100. CPU 204 can also execute a software application (or applications) stored on optical disc 104, which is inserted in optical disk drive 208, or stored in some other memory accessible to CPU 204. User-accessible eject button 210 provided on housing 110 of game console 100 may be used to eject an optical disk from optical disk drive 208.

CPU 204 is connected to system LSI 202 that includes graphics processing unit (GPU) 216 with an associated graphics memory 220, audio digital signal processor (DSP) 218, internal main memory 222 and input/output (IO) processor 224.

IO processor 224 of system LSI 202 is connected to one or more USB ports 226, one or more standard memory card slots (connectors) 228, WiFi module 230, flash memory 232 and wireless controller module 240.

USB ports 226 are used to connect a wide variety of external devices to game console 100. These devices include by way of example without limitation game controllers, keyboards, storage devices such as external hard-disk drives, printers, speakers, microphones, digital cameras, and the like. USB ports 226 may also be used for wired network (e.g., LAN) connections. In one example implementation, two USB ports 226 are provided.

Standard memory card slots (connectors) 228 are adapted to receive industry-standard-type memory cards (e.g., SD memory cards). In one example implementation, one memory card slot 228 is provided. These memory cards are generally used as data carriers but of course this use is provided by way of illustration, not limitation. For example, a player may store game data (including ghost data as described below) for a particular game on a memory card and bring the memory card to a friend's house to play the game on the friend's game console. The memory cards may also be used to transfer data between the game console and personal computers, digital cameras, and the like. Content such as video, photos and music contained on memory cards inserted into slot 228 may be accessed via the user interface of the console for output, for example, using the display screen 101 and speakers 109 of television 102.

WiFi module 230 enables game console 100 to be connected to a wireless access point. The access point may provide internet connectivity for on-line gaming with players at other locations (with or without voice chat capabilities), as well as web browsing, e-mail, social networking, software downloads (including downloads of game software and other applications) and many other types of on-line activities. In some implementations, WiFi module 230 may also be used for communication with other game devices such as suitably-equipped hand-held game devices. Module 230 is referred to herein as "WiFi", which is generally a designation used in connection with the family of IEEE 802.11 specifications (e.g., 802.11, 802.11a, 802.11b, 802.11g, 802.11n, etc.). Game console 100 may of course alternatively or additionally use wireless modules that conform to other wireless standards.

Flash memory 232 stores, by way of example without limitation, game save data, ghost data, system files, internal applications for the console and downloaded data (such as application programs including game programs).

Wireless controller module 240 receives signals wirelessly transmitted from one or more controllers 107 and provides these received signals to IO processor 224. The signals transmitted by controller 107 to wireless controller module 240 may include signals generated by controller 107 itself (e.g., button press data, accelerometer data, gyroscope data, etc.) as well as signals generated by other devices such as nunchuk controller 125 that may be connected to controller 107. Of course, in other implementations, nunchuk controller 125 may directly communicate signals to wireless controller module 240 of console 100. As mentioned above, the communications may use the Bluetooth protocol.

Wireless controller module 240 may also wirelessly transmit signals to controller 107. By way of example without limitation, controller 107 (and/or another game controller such as nunchuk controller 125 connected thereto) may be provided with vibration circuitry and vibration circuitry control signals may be sent via wireless controller module 240 to control the vibration circuitry (e.g., by turning the vibration circuitry on and off). By way of further example without limitation, controller 107 may be provided with (or be connected to) a speaker (not shown) and audio signals for output from this speaker may be wirelessly communicated to controller 107 via wireless controller module 240. By way of still further example without limitation, controller 107 may be provided with (or be connected to) a display device (not shown) and display signals for output from this display device may be wirelessly communicated to controller 107 via wireless controller module 240. It will be appreciated that wireless controller module 240 can communicate signals to nunchuk 125 either directly or via controller 107.

Proprietary memory card slots 246 are adapted to receive proprietary memory cards. In one example implementation, two such slots are provided. These proprietary memory cards have some non-standard feature(s) such as a non-standard connector and/or a non-standard memory architecture. For example, one or more of the memory card slots 246 may be adapted to receive memory cards used with a different gaming platform. In this case, memory cards inserted in such slots can transfer data from games developed for this other gaming platform.

One or more controller connectors 244 are adapted for wired connection to respective game controllers. In one example implementation, four such connectors are provided for wired connection to game controllers. Such game controllers may be for another gaming platform. Alternatively, respective wireless receivers may be connected to connectors 244 to receive signals from wireless game controllers.

A connector 248 is provided for connecting game console 100 to DC power derived, for example, from an ordinary wall outlet. Of course, the power may be derived from one or more batteries.

GPU 216 performs image processing based on instructions from CPU 204. GPU 216 includes, for example, circuitry for performing calculations necessary for displaying three-dimensional (3D) graphics. GPU 216 performs image processing using graphics memory 220 dedicated for image processing and a part of internal main memory 222. GPU 216 generates image data for output to television 102 by audio/video connector 214 via audio/video IC (interface) 212.

Audio DSP 218 performs audio processing based on instructions from CPU 204. The audio generated by audio DSP 218 is output to television 102 by audio/video connector 214 via audio/video IC 212.

External main memory 206 and internal main memory 222 are storage areas directly accessible by CPU 204. For example, these memories can store application programs such as game programs or other software applications, applets, scripts, etc. read from optical disc 104 by the CPU 204, game program or other software applications, applets, scripts, etc. read from flash memory 232 by CPU 204, various types of data and the like.

ROM/RTC 238 includes a real-time clock and is preferably powered by an internal battery (not shown) so as to be usable even if no external power is supplied. ROM/RTC 238 also may include a boot ROM and SRAM usable by the console.

Power button 242 is used to power game console 100 on and off. In one example implementation, power button 242 must be depressed for a specified time (e.g., one or two seconds) to turn the console off so as to reduce the possibility of inadvertently turn-off. Reset button 244 is used to reset (re-boot) game console 100.

Figure 3:
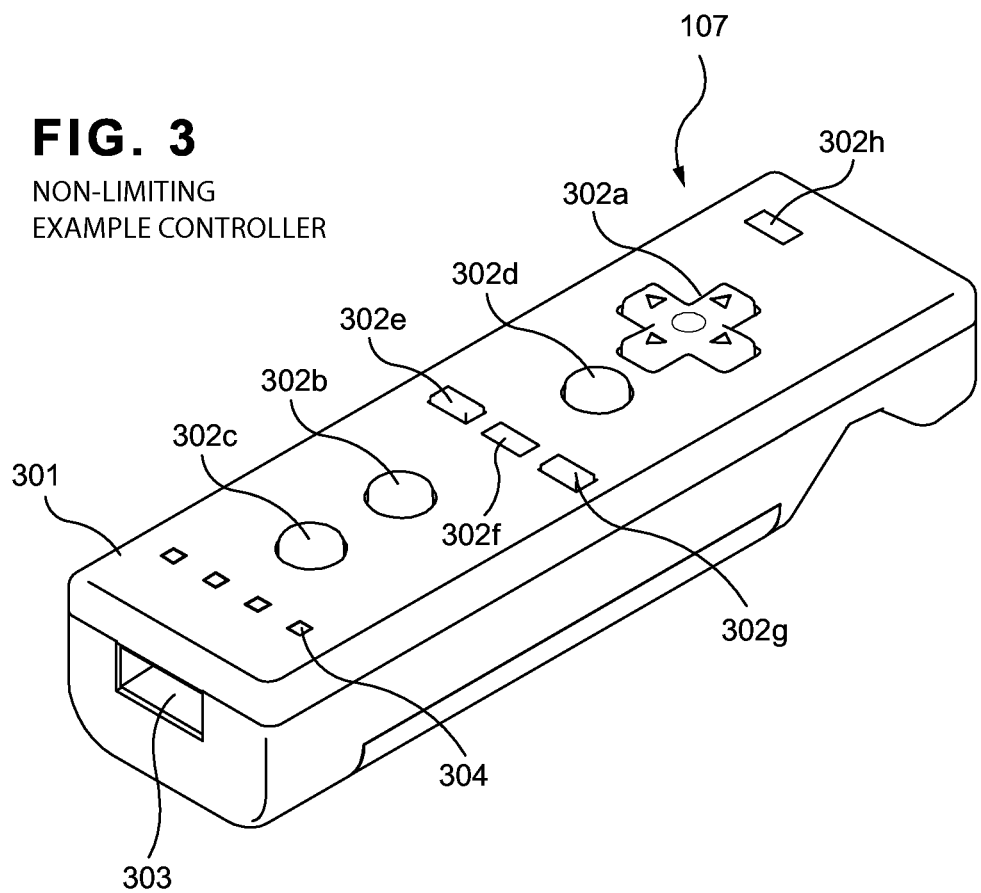
FIG. 3 shows a more detailed view of an operation section of example controller 107.

With reference to FIG. 3, example controller 107 includes a housing 301 on which operating controls 302a-302h are provided. Housing 301 has a generally parallelepiped shape and is sized to be conveniently grasped by a player's hand. Cross-switch 302a is provided at the center of a forward part of a top surface of the housing 301. By actuating cross-switch 302a (e.g., up, down, left, right), the player can, for example, move a player character in different directions in a virtual game world.

Buttons (or keys) 302b through 302g are provided rearward of cross-switch 302a on the top surface of housing 301. Buttons 302b through 302g are operation devices that output respective signals when a player presses them. Generally, buttons 302b through 302g are assigned various functions in accordance with the application being executed by game console 100. Button 302h is a power switch for remote on-off switching of the power to game console 100.

A plurality (e.g., four) of LEDs 304 is provided rearward of button 302c on the top surface of housing 301. Controller 107 is assigned a controller type (number) so as to be distinguishable from other controllers used with game console 100 and LEDs 304 may be used to provide a player a visual indication of this assigned controller number.

Program instructions for the video game may be encoded onto an optical disk 104 (i.e., a non-transitory computer readable medium), which is inserted in optical disk drive 208 of game console 100. Alternatively, the program instructions may be downloaded to game console 100 (e.g., via a wired or wireless connection to the internet) and stored in on-board memory, such as flash memory 232. In either case, these program instructions are executed by CPU 204, and GPU 216 performs image processing based on instructions from CPU 204. Images resulting from the image processing are displayed on television 102. Audio DSP 218 performs audio processing for the game based on instructions from CPU 204. Audio resulting from the audio processing is output via speakers 109 of television 102.

The example systems and methods described herein involve so-called "ghost data." In racing-type video games, it is known to store ghost data indicative of a player character's racing performance in a race. The same or a different player character can then race against a ghost character in a subsequent race, the performance of the ghost character in the subsequent race being based on the ghost data stored in the prior race. For example, in the Mario Kart 64 video game, the game program captures ghost data as a player character's vehicle races around the track, recording vehicle location information at various points during the race. Once the race is complete, the player can choose to race on the track again and compete against a "ghost" car whose position during the race is determined by the ghost data stored during the previous race.

In the example systems and methods involving the ghost feature described herein, CPU 204 executes a video game program stored, for example, on optical disc 104 or in flash memory 232 and loaded into main memory 206 and/or 222. The execution of the video game program generates a three-dimensional (3D) virtual game world within which player characters can move based on, for example, inputs to controller(s) 107 by respective game players. One or more virtual cameras are positioned in the virtual game world and images virtually "captured" by these cameras are displayed on television 102. Sounds in the virtual world are output via speakers 109 associated with television 102.

Generally speaking, each game player is assigned to or chooses a particular player character to control during game play. Thus, game player 1 controls player character 1, game player 2 controls player character 2, etc. The appearance characteristics of player characters during game play are generally determined by the video game program. In some instances, the video game program includes instructions for permitting a player to designate or customize certain aspects of the player character appearance. These aspects may include, but are not limited to, facial characteristics, hair style and color, and the like.

Each game player typically uses his/her own controller 107 to control a corresponding player character. Such control includes, by way of example and without limitation, movements and actions of a player character within the game world. In the example video game program executed by game system 10, a player character moves in a free-roaming manner (e.g., not confined to movement along some predetermined track or path such as a race track) in the 3D virtual game world according to inputs supplied via controller 107.

As part of a game set-up process, a game player may choose (e.g., by a menu selection) for game system 10 to periodically store ghost data for a player character. In other example implementations, ghost data may be stored during game play for multiple player characters. This ghost data may be stored during execution of the video game program in a game session every frame, every x frames, x times per second (e.g., 30 times per second) or at some other periodic interval. The interval may be constant throughout the video game or may vary as the video game is played (e.g., every frame for some parts of the video game and every other frame for other parts of the video game). In alternative implementations, the video game program may automatically store ghost data periodically during game play and generate a display (e.g., on television 102) at the end of game play requesting player input as to whether the ghost data should be saved for use in a subsequent game session. The player may also be given an opportunity designate a location for storing the ghost data (e.g., in local on-board memory, on a memory card and/or on a server).

As discussed, the ghost data is used to generate a ghost character which appears during a subsequent game play session. Various types of data may be stored to generate the ghost character and control its behavior (e.g., movement and/or actions) during the subsequent game play session.

Figure 4:
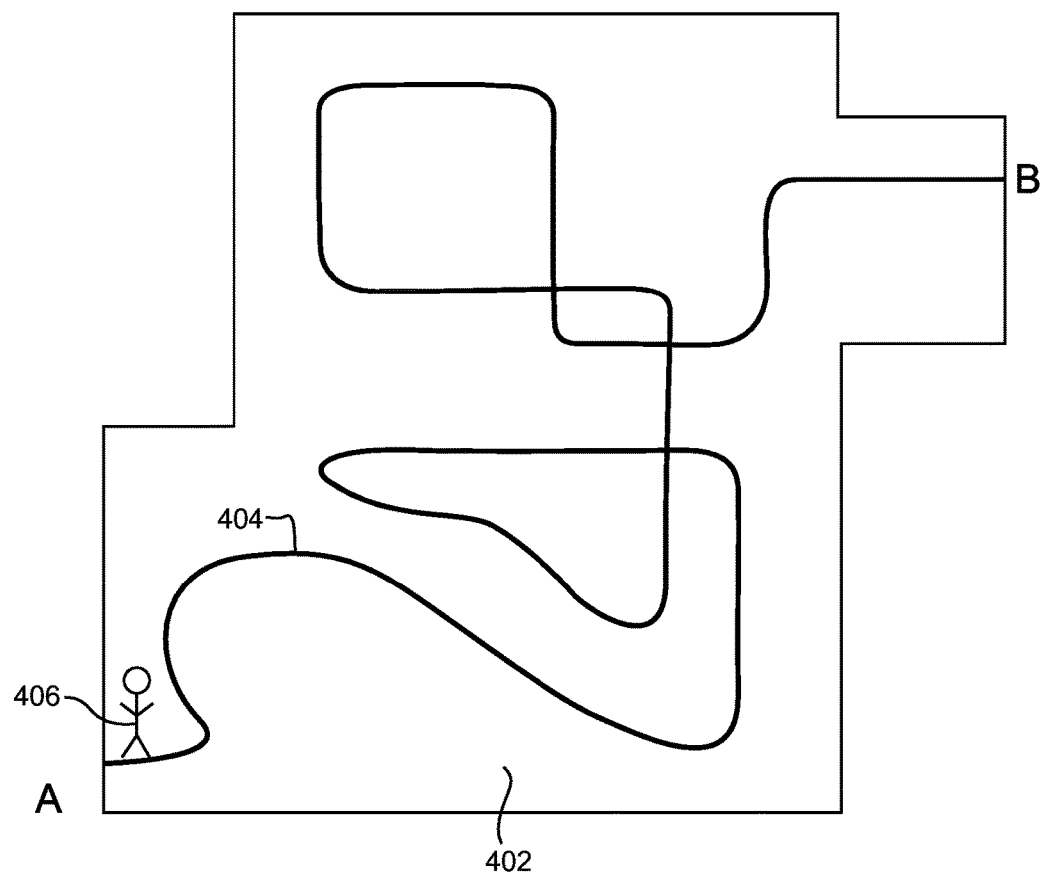
FIG. 4 illustrates an example path through a virtual game world.

By way of example and without limitation, position data indicative of the player character's position in the 3D virtual game world over time may be stored periodically. This position data may include coordinate data (e.g., x, y, z coordinates) with respect to a world system of coordinates. FIG. 4 shows an illustrative two-dimensional path 404 of a player character 406 that moved from A to B in a portion 402 of a virtual game world during a particular game play session. Position data is periodically stored as the player character moves along this path in response to game player inputs via controller 107. In a non-limiting example implementation, the position data is stored for every frame so that the ghost data for player character 406 includes position data as follows:

TABLE I

| Frame Number | Position |
|---|---|
| 1 (at Point A) | (x1, y1) |
| 2 | (x2, y2) |
| 3 | (x3, y3) |
| ... | ... |
| N (at Point B) | (xn, yn) |

It will be appreciated that the position data can be readily extended to three-dimensions by including z-coordinate values. Using this position data, a corresponding ghost character can be controlled to move along the same path 404 during a subsequent game play session.

In addition to or as an alternative to storing position data, inputs to the controller 107 can be stored. With reference to FIG. 3, inputs (e.g., up, down, left, right) to cross-switch 302a for moving a player character in the 3D virtual game world (e.g., along path 404) can be stored periodically. In a non-limiting example implementation, the inputs are stored for every frame so that the ghost data for player character 406 includes example input data as follows:

TABLE II

| Frame Number | Input |
|---|---|
| 1 (at Point A) | Cross-switch RIGHT |
| 2 | Cross-switch RIGHT |
| 3 | Cross-switch UP |
| ... | ... |
| N (at Point B) | Cross-Switch RIGHT |

Using these stored cross-switch inputs, a corresponding ghost character can be controlled to move along the same path (e.g., path 404) during a subsequent game play session. Inputs to other buttons, keys, triggers, etc. as game play proceeds can also be stored.

If controller 107 is provided with inertial sensors (e.g., accelerometers, gyroscopes and the like), information corresponding to outputs from these sensors may also be stored.

The ghost data can also record information about events or sights the player character encounters along path 404. For example, the ghost data could record that the player character fought an evil enemy at position (xi, yi). When the corresponding ghost character reaches that same position, a message associated with the ghost character, such as "Here is where I fought the evil enemy!", may be displayed on television 102 if the player character and ghost character are captured by the same virtual camera. The ghost data could also record an outcome associated with such events and the message could reflect this outcome (e.g., "Here is where I defeated the evil enemy!").

Other attributes associated with the player character (e.g., weapon choice, weapon use, strength, vitality, game level, and the like) during a game play session may also be stored as part of the ghost data and used to control the appearance and/or behavior of ghost character(s) during a subsequent game play session. In particular, the ghost data for a particular player character may include an avatar of the game player controlling that player character.

During a game play session, the above-described ghost data for the one or more player characters may be stored in main memory 206 and/or 222. At the end of the game play session, this ghost data may be written to flash memory 232 so that it can be non-volatilely stored and easily accessed for use during a subsequent game play session. In other implementations, ghost data in main memory 206 and/or 222 may be periodically written to flash memory 232 or may be directly stored in flash memory 232. Of course, the ghost data may be stored in any convenient local and/or remote memory. Thus, for example, the ghost data may be stored locally in flash memory 232 and/or a portable memory medium (e.g., an SD card received in standard memory card slot 228) and a copy of the ghost data may be stored remotely in a server accessible to game system 10. The ghost data may be stored as part of a file which also stores other information such as, but not limited to, player information for identifying the game player associated with the player character whose attribute information is stored; avatar information for the game player; time and/or date of game play session(s); game level; identification information identifying game system 10; and the like. The ghost data may be compressed and/or encrypted for storage and/or transmission if necessary or desired.

Thus, in accordance with the systems and methods described herein, a game player (or players) plays a video game and ghost data for the player character(s) controlled by the game player (or players) is stored. This ghost data is usable to provide ghost character(s) that appear during a subsequent game play session. For example, the ghost data controls the appearance and/or behavior (e.g., movement and/or actions) of ghost character(s) that appear during subsequent game play.

Figure 5:
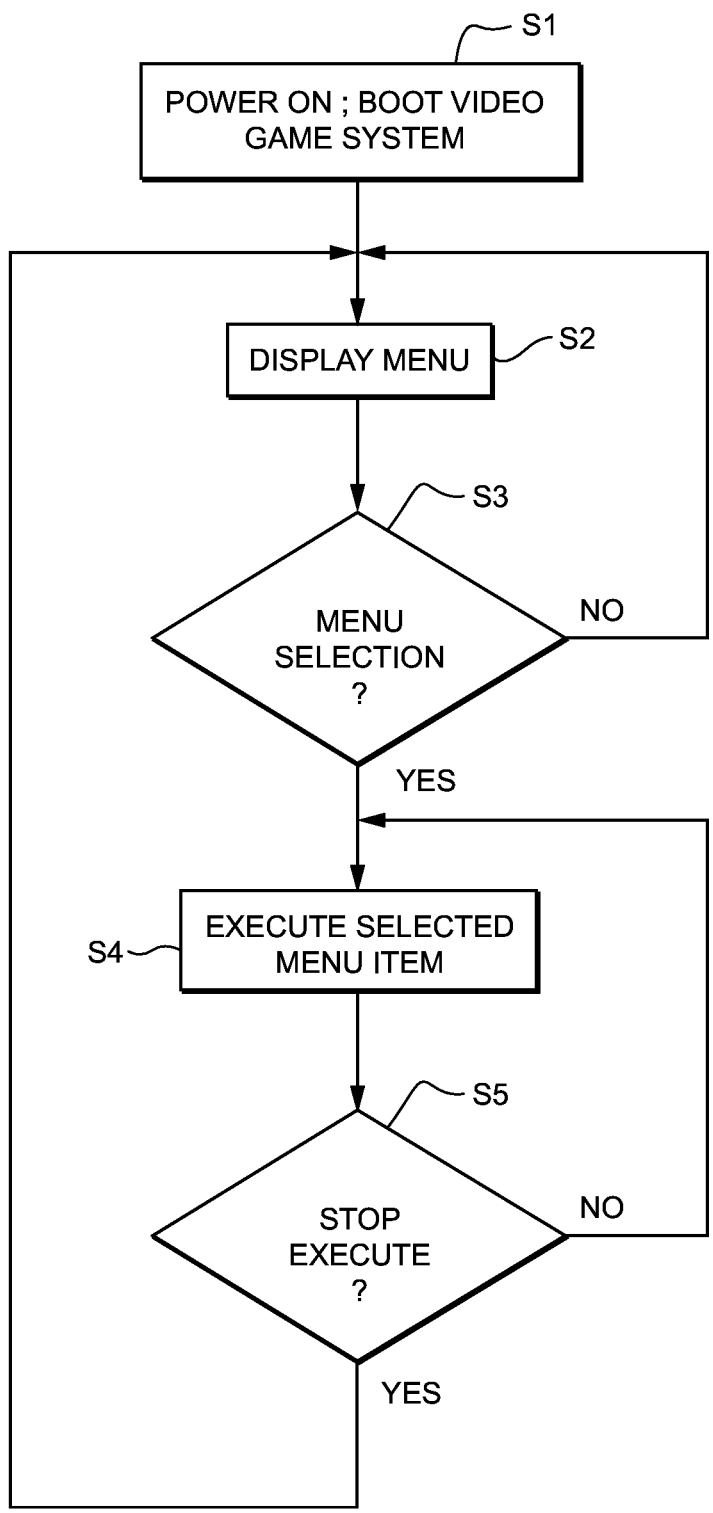
FIG. 5 is a flow chart showing an example game process.

FIG. 5 is a flow chart setting forth certain aspects of a non-limiting, example game play process. In this example, the FIG. 5 processes are variously controlled by CPU 204, along with GPU 216 and audio DSP 218 as appropriate. It will be readily apparent that the game play process may include other steps (e.g., powering off) that are not shown in the flow chart of FIG. 5.

At step S1, game system 10 boots up in response to being powered on (e.g., by pressing power button 242). At step S2, game system 10 displays a menu on television 102. The menu provides various selectable options for a player including one or more options for launching an application program such as a video game. If the player makes a menu selection at S3, the selected option (e.g., application program) is executed by CPU 204 at S4. The execution of the selected option continues until a stop execution input is received as determined at S5. When the stop input is received, game system 10 returns to S2 and displays the menu.

Figure 6:
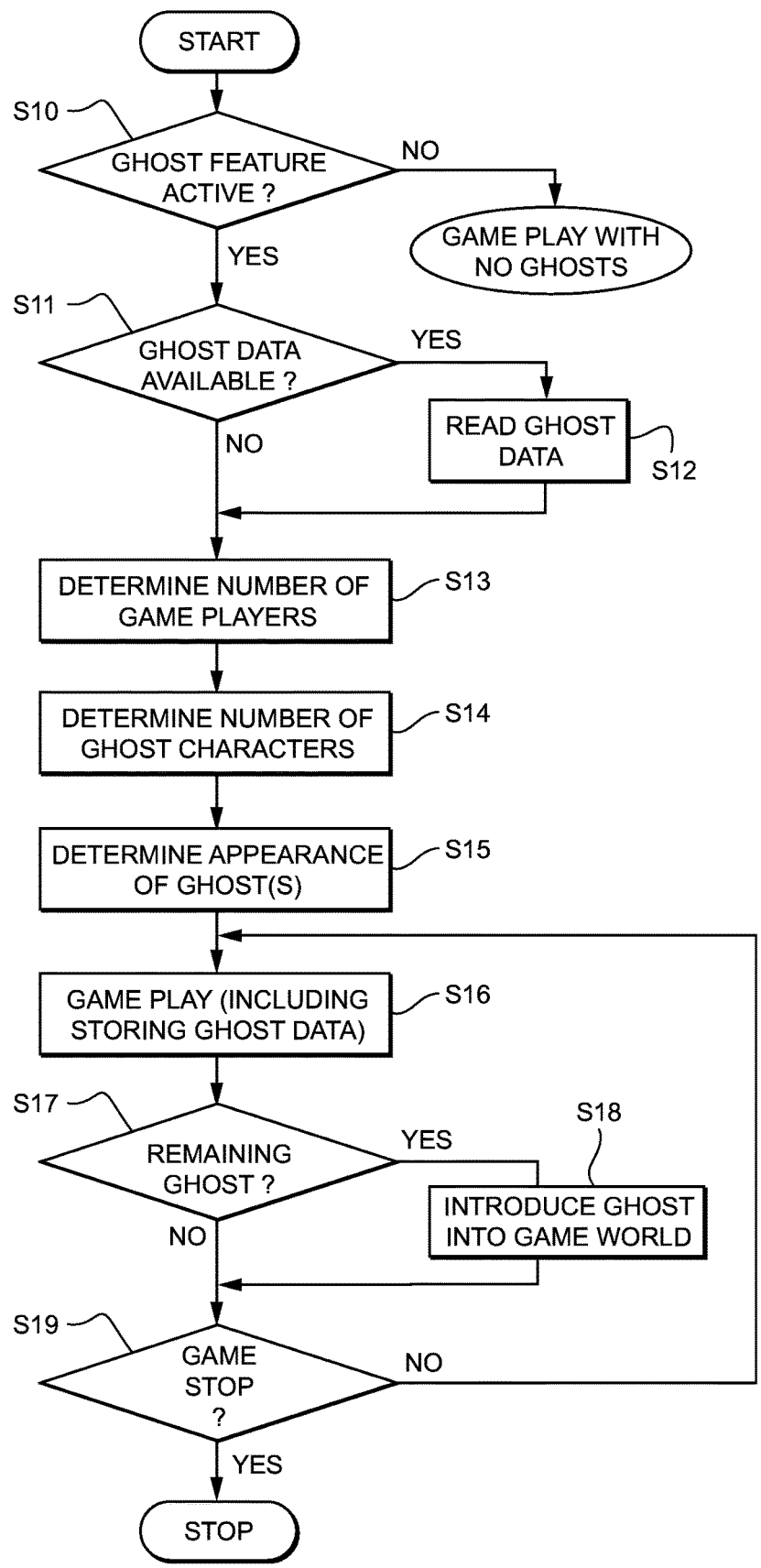
FIG. 6 is a flow chart showing an example ghost character process.

FIG. 6 is a flow chart showing certain aspects of the application program execution step S4 when the application program is a video game program including the example ghost feature described herein.

At S10, game system 10 executing the video game program determines whether the ghost feature is active for the video game program. In some instances, the video game program includes instructions for automatically activating the ghost feature and in other instances the ghost feature is activated/deactivated in response to user inputs provided, for example, using controller 107. If the ghost feature is not active, game play proceeds with no ghost characters.

If the ghost feature is active, at S11, game system 10 executing the video game program determines whether any stored ghost data generated during a prior game play session is accessible for the video game being executed. In video games with multiple levels, the game system may determine whether ghost data is available for the particular game level being played. As noted above, the ghost data may be stored locally and/or remotely and thus game system 10 may check local memories (e.g., flash memory 232) and/or remote memory(ies) for the ghost data. Regarding remote memory, a game player may have associated remote storage on a particular server or the game system itself may have associated remote storage. For example, a game player may use game system 10 to set up a storage location on a remote server to which various data (including ghost data for player characters associated with the game player) may be written. Alternatively or in addition, as part of the set-up process for game system 10 or for a particular video game played using game system 10, storage on a remote server may be automatically (or manually in response to player inputs) set up for the game system.

If ghost data is available locally and/or remotely, game system 10 executing the video game program reads the ghost data and loads the ghost data into main memory 206 and/or 222 for use during the current game play session at S12. If multiple ghost data are available (e.g., ghost data in local memory and ghost data in remote memory), the game system may select the most recent ghost data or a selection may be made in accordance with user input.

At S13, game system 10 executing the video game program determines the number of players playing the video game. This determination may be made, for example, during the game set-up process. For example, the game set-up process may include a screen displayed on television 102 requesting input of the number of game players. Of course, for some games (e.g., first person games), the number of players is determined by the game program itself.

At S14, the number of ghost characters is determined based on the number of game players determined at S13. In the present example, the number of the ghost characters appearing in the 3D virtual game world is based on the number of game players. By way of example and without limitation, Table III below sets forth an illustrative relationship between the number of game players and the number of ghost characters:

TABLE III

| number of game players | number of ghosts |
| --- | --- |
| 1 | 3 |
| 2 | 2 |
| 3 | 1 |
| 4 | 0 |

Thus, in this non-limiting example, the number of ghost characters is determined so that the sum total of the number of ghost characters and the number of game players is equal to four.

Depending on prior game play, it is possible that there may be ghost data for fewer ghost characters than the number of ghost characters determined at S14. Consequently, in order to implement the ghost feature described in this example, the video game program may include predetermined "dummy" ghost data that may be used to generate ghost characters in the event there is insufficient ghost data from prior game play sessions. For example, the video game program may include sufficient dummy ghost data for generating up to three ghost characters (the maximum number of ghost characters in Table III) for a situation in which the video game is being played for the first time. In another implementation, the video game program may include instructions for generating the ghost character(s) during game play without using predetermined dummy ghost data. In still another implementation, game system 10 may access remote storage storing dummy ghost data or ghost data generated by game play sessions on other game systems. In still other implementations, game system 10 may simply use the ghost data that is available.

At S15, the appearance of the ghost character is determined. Generally speaking, in prior art implementations, the appearance of the ghost character corresponds to that of the player character whose ghost data is used to generate the ghost character. Moreover, in many prior art implementations, the ghost character is translucent in order, for example, to be distinguished from player characters. In the example ghost feature described herein, the appearance of a ghost character corresponds to an avatar of the game player who controlled the player character when the ghost data was generated. Moreover, in the ghost feature described herein, the ghost character is not translucent. It is displayed using data of the avatar included in the ghost data. Of course, the appearance is not limited to an avatar of the game player. Appearance data may be stored as part of the ghost data or, for example, game system 10 may access appearance data stored elsewhere for use in the example ghost feature.

At S16, game play begins. The game play includes storing ghost data for one player character or for more than one player character. In particular, in some non-limiting example embodiments, the game play stores ghost data for only one player character. The one player may be determined in accordance with the game program or in accordance with user selection. In some other non-limiting example embodiments, the game play stores ghost data for multiple player characters. Here again, these multiple players may be determined in accordance with the game program or in accordance with user selection. At S17, a determination is made as to whether any remaining ghost characters should appear in the 3D virtual game world. If so, a ghost character becomes present at S18.

In the prior art, the presence of a ghost character is generally synchronized with the start of a game. For example, in a racing game, a ghost character is present at the start of the racing so that a game player can compete (race) against the ghost character. However, the presence of ghost characters in the present example need not be synchronized with the start of the game. Moreover, in the case of multiple ghost characters, the ghost characters can become present in the virtual game world at different times, thereby causing the number of ghost characters to increase gradually as the game proceeds.

For example, ghost characters may become present in the game world in accordance with the following timing offsets from the start of the game session:

TABLE IV

| Ghost Character | Timing of display |
|---|---|
| 1st ghost character | 90 frames after a game session start |
| 2nd ghost character | 135 frames after a game session start |
| 3rd ghost character | 180 frames after a game session start |

Thus, after a player character is displayed at the beginning of the game play session, the number of ghost characters increases gradually. Of course, the timings shown in Table IV are merely examples and other timings may be used. Moreover, the interval between each ghost character becoming present need not be the same.

Ghost characters will be displayed on television 102 when the ghost character is present in the field of view of a virtual camera. Because the movement of the ghost character(s) in accordance the ghost data and the movement of the player character(s) are independent of one another, the presence of ghost characters in the virtual world does not necessarily mean that a player character will encounter any of them during game play.

In some implementations, the ghost character's position when it becomes present in the game world is determined by reference to the ghost character's position in the ghost data at the frame (or time) at which it becomes present. Thus, with reference to the 1st ghost in Table IV above, the ghost character would become present in the virtual game world at its position at the 90th frame (e.g., at (x90, y90) using the convention of Table I). Thereafter, the ghost character proceeds to move in the 3D virtual game world (i.e., to (x91, y91), then to (x92, y92), etc.) in accordance with the ghost data. In another implementation, when the ghost character becomes present in the game world at the 90th frame of the game play session, its position corresponds to the initial position in the ghost data (e.g., at (x1, y1) using the convention of Table I). Again, thereafter, the ghost character proceeds to move in the 3D virtual game world (i.e., to (x2, y2), then to (x3, y3), etc.) in accordance with the ghost data.

As the player characters move in the game world, one or more ghost characters may be visible. In particular, as a player character moves in the virtual world, it may encounter a ghost character whose position causes it to be in the same virtual camera image as the player character. Because the ghost characters appear as an avatar corresponding to a game player, a game player playing the current game play session may be able to identify the game player whose avatar appears. A game player in the current game play session may, for example, choose to follow a particular ghost character as the ghost character moves in the 3D virtual game world.

Game play continues until a game stop input is received (S19). At this time, game play stops.

The ghost feature described herein may be used in games of the type in which game characters can move freely within a virtual space. In other words, the ghost feature described herein in not limited to games in which player characters proceed along predetermined routes such as a race track.

If a ghost character reaches the end of its path before the end of a game play session, the video game program may control the ghost character to start again at (x1, y1). Alternatively, the presence of the ghost character in the virtual game world can end.

It will be appreciated that video games often have different game levels and that ghost data may be stored for each different level. A determination of game level may be made at the beginning of a game play session so that ghost data for the appropriate game level may be accessed and used.

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a non-transitory machine-readable storage device for execution by a programmable processor. A process embodying these techniques may be performed by a programmable hardware processor executing a suitable program of instructions to perform desired functions by operating on input data and generating appropriate output. The techniques may be implemented in one or more computer programs that are executable on a programmable processing system including at least one programmable processor coupled to receive data and instructions from, and to transmit data and instructions to, a data storage system, at least one input device, and at least one output device. Each computer program may be implemented in a high-level procedural or object-oriented programming language or in assembly or machine language, if desired; and in any case, the language may be a compiled or interpreted language. Suitable processors include, by way of example, both general and special purpose microprocessors. Generally, a processor will receive instructions and data from a read-only memory and/or a random access memory. Non-transitory storage devices suitable for tangibly embodying computer program instructions and data include all forms of computer memory including, but not limited to, non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

We claim:

1. A video game system comprising:
   user controls;
   memory for storing a video game program; and
   a processing system including at least one hardware processor configured to execute the video game program to at least:
   generate a three-dimensional (3D) virtual game world including a player character;
   capture, using one or more virtual cameras, images of at least part of the 3D virtual game world;
   generate, for display, video game images based on the images captured by the virtual cameras;
   periodically store, in the memory, during a first game play session, movement data for the player character as the player character moves in the 3D virtual game world, based on inputs to the user controls; and
   generate a ghost character during a second game play session and control movement of the ghost character in the 3D virtual game world to correspond to the movement of the player character during the first game play session based on the movement data stored in the memory, wherein
   the ghost character is not present in the 3D virtual game world at the beginning of the second game play session and becomes present in the 3D virtual game world in the second game play session at a time subsequent to the beginning of the second game play session.

2. The video game system according to claim 1, wherein the virtual game world includes multiple player characters and the processing system periodically stores in the memory respective movement data for each of the multiple player characters during the first game play session.

3. The video game system according to claim 2, wherein the processing system generates multiple ghost characters during the second game play session, movement of each ghost character being based on the stored movement data of a corresponding one of the player characters.

4. The video game system according to claim 3, wherein each ghost character becomes present in the 3D virtual game world at a different respective time during the second game play session.

5. The video game system according to claim 4, wherein each ghost character appears at a different number of frames subsequent to the beginning of the second game play session.

6. The video game system according to claim 2, wherein the number of ghost characters is determined based on the number of player characters in the second game play session.

7. The video game system according to claim 6, wherein the total number of ghost characters and player characters in the second game play session is equal to a predetermined number.

8. The video game system according to claim 7, wherein the predetermined number is four.

9. The video game system according to claim 1, wherein the ghost character differs in appearance from the player character.

10. The video game system according to claim 9, wherein the ghost character comprises an avatar of a game player.

11. A video game system comprising:
    user controls;
    memory for storing a video game program; and
    a processing system including at least one hardware processor configured to execute the video game program to at least:
    generate a three-dimensional (3D) virtual game world including multiple player characters;
    capture, using one or more virtual cameras, images of at least part of the 3D virtual game world;
    generate, for display, video game images based on the images captured by the virtual cameras;
    periodically store, in the memory, during a first game play session, movement data for each player character as the player characters move in the virtual world, based on inputs to the user controls; and
    generate ghost characters during a second game play session and control movement of each ghost character in the 3D virtual game world to correspond to movement of a corresponding player character during the first game play session based on the movement data stored in the memory, wherein
    the respective ghost characters become present in the 3D virtual game world at different times during the second game play session.

12. The video game system according to claim 11, wherein the respective ghost characters become present in the 3D virtual game world at different times in the second game play session starting at a time subsequent to the beginning of the second game play session.

13. The video game system according to claim 12, wherein each ghost character becomes present in the 3D virtual game world at a different number of frames subsequent to the beginning of the second game play session.

14. The video game system according to claim 11, wherein each ghost character differs in appearance from its corresponding player character.

15. The video game system according to claim 14, wherein each ghost character comprises an avatar for a game player associated with the corresponding player character.

16. The video game system according to claim 11, wherein the number of ghost characters is determined based on the number of player characters in the second game play session.

17. The video game system according to claim 16, wherein the total number of ghost characters and player characters in the second game play session is equal to a predetermined number.

18. The video game system according to claim 17, wherein the predetermined number is four.

19. A video game system comprising:
    user controls;
    memory for storing a video game program; and
    a processing system including at least one hardware processor configured to execute the video game program to at least:
    generate a three-dimensional (3D) virtual game world including a player character;
    capture, using one or more virtual cameras, images of at least part of the 3D virtual game world;
    generate, for display, video game images based on the images captured by the virtual cameras;
    periodically store, in the memory, during a first game play session, movement data for the player character as the player character freely moves in the 3D virtual game world, based on inputs to the user controls; and
    generate a ghost character during a second game play session and control movement of the ghost character in the 3D virtual game world to correspond to the movement of the player character during the first game play session based on the movement data stored in the memory, wherein the ghost character is not present in the 3D virtual game world at the beginning of the second game play session and becomes present in the 3D virtual game world in the second game play session at a time subsequent to the beginning of the second game play session.

20. A video game system comprising:

user controls;

memory for storing a video game program; and a processing system including at least one hardware processor configured to execute the video game program to at least:

generate a three-dimensional (3D) virtual game world including a player character;

capture, using one or more virtual cameras, images of at least part of the 3D virtual game world;

generate, for display, video game images based on the images captured by the virtual cameras;

periodically store, in the memory, during a first game play session, movement data for the player character as the player character moves in the 3D virtual game world, based on inputs to the user controls by a game player; and generate a ghost character during a second game play session and control movement of the ghost character in the 3D virtual game world to correspond to the movement of the player character during the first game play session based on the movement data stored in the memory, wherein the ghost character is an avatar of the game player.

21. A non-transitory computer-readable storage medium storing a program which, when executed by a computer of a video game system, causes the video game system to at least:

generate a three-dimensional (3D) virtual game world including at least one player character;

capture, using one or more virtual cameras, images of at least part of the 3D virtual game world;

generate, for display, video game images based on the images captured by the virtual cameras;

periodically store, in a memory, during a first game play session, movement data for the player character as the player character moves in the virtual world during a first game play session based on inputs to user controls; and generate a ghost character during a second game play session and control movement of the ghost character in the 3D virtual game world to correspond to the movement of the player character during the first game play session based on the movement data stored in the memory, and wherein the ghost character is not present in the 3D virtual game world at the beginning of the second game play session and becomes present in the 3D virtual game world in the second game play session at a time subsequent to the beginning of the second game play session.

22. A non-transitory computer-readable storage medium storing a program which, when executed by a computer of a video game system, causes the video game system to at least:

generate a three-dimensional (3D) virtual game world including multiple player characters;

capture, using one or more virtual cameras, images of at least part of the 3D virtual game world;

generate, for display, video game images based on the images captured by the virtual cameras;

periodically store, in a memory, during a first game play session, movement data for each player character as the player characters move in the virtual world, based on inputs to the user controls;

generate ghost characters during a second game play session and control movement of each ghost character in the 3D virtual game world to correspond to movement of a corresponding player character during the first game play session, based on the movement data stored in the memory, wherein the respective ghost characters become present in the 3D virtual game world at different times during the second game play session.

23. A video game system comprising:

user controls;

memory for storing a video game program; and a processing system including at least one hardware processor configured to execute the video game program to at least:

generate a three-dimensional (3D) virtual game world including a player character;

capture, using one or more virtual cameras, images of at least part of the 3D virtual game world;

generate, for display, video game images based on the images captured by the virtual cameras;

access a memory storing movement data corresponding to movement of the same or a different player character during a prior game play session; and begin a current game play session in which the player character and ghost character move in the 3D virtual game world, the movement of the player character being controlled in accordance with movement inputs to a control device during the current game play session, wherein the ghost character is not present in the 3D virtual game world at the beginning of the current game play session and becomes present in the 3D virtual game world after the beginning of the current game session, and movement of ghost character is automatically controlled in the 3D game world to correspond to movement of the same or different player character in the prior game play session in accordance with the accessed stored movement data and without any movement input to the control device.

* * * * *